United States Patent
Sakata

(10) Patent No.: US 8,726,150 B2
(45) Date of Patent: May 13, 2014

(54) WEB PAGE DISTRIBUTION SYSTEM

(75) Inventor: Kazutoshi Sakata, Tokyo (JP)

(73) Assignee: Symmetric Co., Ltd., Tokyo (JP)

( * ) Notice: Subject to any disclaimer, the term of this patent is extended or adjusted under 35 U.S.C. 154(b) by 0 days.

(21) Appl. No.: 12/995,238

(22) PCT Filed: Jun. 2, 2009

(86) PCT No.: PCT/JP2009/002482
§ 371 (c)(1),
(2), (4) Date: Mar. 25, 2011

(87) PCT Pub. No.: WO2009/147844
PCT Pub. Date: Dec. 10, 2009

(65) Prior Publication Data
US 2011/0167333 A1 Jul. 7, 2011

(30) Foreign Application Priority Data
Jun. 3, 2008 (JP) .................................. 2008-146238

(51) Int. Cl.
*G06F 17/00* (2006.01)

(52) U.S. Cl.
USPC ........... 715/249; 715/239; 715/252; 715/234; 715/760; 715/205; 707/E17.121; 707/E17.119

(58) Field of Classification Search
USPC ......... 715/202–203, 229, 234, 236, 238, 239, 715/248–249, 733, 735, 745, 748, 753, 800, 715/815, 866, 205, 209, 243, 252, 760; 709/206, 217, 227, 246, 250; 707/E17.121, E17.119
See application file for complete search history.

(56) References Cited

U.S. PATENT DOCUMENTS 6,300,947 B1 * 10/2001 Kanevsky .................... 715/866
6,457,030 B1 * 9/2002 Adams et al. ................. 715/239

(Continued)

FOREIGN PATENT DOCUMENTS

| JP | 11-345201 A | 12/1999 |
|---|---|---|
| JP | 2000-305837 A | 11/2000 |

(Continued)

OTHER PUBLICATIONS

Han et al.,"Dynamic Adaptation in an Image Transcoding Proxy for Mobile Web Browsing," © 1998, IEEE, pp. 8-17.*

(Continued)

*Primary Examiner* — Cesar Paula
*Assistant Examiner* — James H Blackwell
(74) *Attorney, Agent, or Firm* — MKG, LLC

(57) ABSTRACT

Provided is a web page distribution system capable of distributing web pages that satisfy the output condition of a distribution target. The web page distribution system comprises a plurality of mobile phones and a web page distribution server. The mobile phones can communicate with Internet and have individually set output conditions for outputting all web pages including text data and image data referred to from the text data. The web page distribution server specifies, based on the reception of the distribution request for the web pages, the output conditions of the mobile phones and determines whether the web pages satisfy the specified output conditions or not. When it is determined that the output conditions are not satisfied, the web page distribution server converts the web pages that do not satisfy the output conditions into the ones that satisfy the output conditions and performs a process for distributing the web pages.

1 Claim, 7 Drawing Sheets

(56) References Cited

U.S. PATENT DOCUMENTS

| | | | |
|---|---|---|---|
| 6,563,517 B1* | 5/2003 | Bhagwat et al. | 715/735 |
| 6,871,236 B2* | 3/2005 | Fishman et al. | 709/246 |
| 7,165,224 B2* | 1/2007 | Pyhalammi | 715/748 |
| 7,337,392 B2* | 2/2008 | Lue | 715/236 |
| 7,500,195 B2* | 3/2009 | Sahota et al. | 715/733 |
| 7,584,423 B2* | 9/2009 | Rohrabaugh et al. | 715/238 |
| 7,669,121 B2* | 2/2010 | Kiilerich | 715/249 |
| 7,694,221 B2* | 4/2010 | Fortes | 715/249 |
| 7,707,253 B2* | 4/2010 | Miyagi et al. | 709/206 |
| 7,823,083 B2* | 10/2010 | Rohrabaugh et al. | 715/815 |
| 7,831,926 B2* | 11/2010 | Rohrabaugh et al. | 715/800 |
| 7,853,939 B2* | 12/2010 | Kato et al. | 717/158 |
| 7,873,901 B2* | 1/2011 | Chen et al. | 715/234 |
| 8,020,090 B2* | 9/2011 | Chen et al. | 715/238 |
| 8,181,107 B2* | 5/2012 | Melnyk et al. | 715/238 |
| 2001/0047517 A1* | 11/2001 | Christopoulos et al. | 725/87 |
| 2002/0016801 A1* | 2/2002 | Reiley et al. | 707/523 |
| 2002/0062325 A1* | 5/2002 | Berger et al. | 707/518 |
| 2002/0069218 A1* | 6/2002 | Sull et al. | 707/501.1 |
| 2002/0078253 A1* | 6/2002 | Szondy et al. | 709/315 |
| 2003/0050931 A1* | 3/2003 | Harman et al. | 707/100 |
| 2003/0115365 A1* | 6/2003 | Lindsey | 709/246 |
| 2004/0083291 A1* | 4/2004 | Pessi et al. | 709/227 |
| 2004/0148571 A1* | 7/2004 | Lue | 715/514 |
| 2004/0183828 A1* | 9/2004 | Nichogi et al. | 345/745 |
| 2004/0267965 A1* | 12/2004 | Vasudevan et al. | 709/250 |
| 2006/0048051 A1* | 3/2006 | Lazaridis | 715/517 |
| 2006/0184639 A1* | 8/2006 | Chua et al. | 709/217 |
| 2007/0074097 A1* | 3/2007 | Laksono | 715/501.1 |
| 2007/0130626 A1* | 6/2007 | Kato et al. | 726/27 |
| 2007/0157241 A1* | 7/2007 | Walker | 725/46 |
| 2008/0072139 A1* | 3/2008 | Salinas et al. | 715/238 |
| 2008/0176544 A1* | 7/2008 | Holdsworth | 455/414.3 |
| 2008/0195955 A1* | 8/2008 | Salesky et al. | 715/753 |
| 2008/0235573 A1* | 9/2008 | Serdy et al. | 715/239 |

FOREIGN PATENT DOCUMENTS

| | | |
|---|---|---|
| JP | 2001-195391 A | 7/2001 |
| JP | 2003-173440 A | 6/2003 |
| JP | 2003-281030 A | 10/2003 |

OTHER PUBLICATIONS

Chandra et al.,"Multimedia Web Services for Mobile Clients Using Quality Aware Transcoding," © 1999, ACM, pp. 99-108.*

Richard Han,"Factoring a Mobile Client's Effective Processing Speed Into the Image Transcoding Decision," © 1999, ACM, pp. 91-98.*

International Preliminary Report and Written Opinion for PCT/JP2009/002482 dated Jul. 7, 2009.

* cited by examiner

Fig. 2A

Output Condition 1

| Description Language | HTML1 |
|---|---|
| Display Size | Length 320 Width 240 |
| Total Data Size | 100KB |

Output Condition 2

| Description Language | HTML2 |
|---|---|
| Display Size | Length 320 Width 240 |
| Total Data Size | 50KB |

Output Condition 3

| Description Language | HTML3 |
|---|---|
| Display Size | Length 160 Width 120 |
| Total Data Size | 5KB |

Fig. 2B

Web Page

| Description Language | HTML1 |
|---|---|
| Text Data | 5KB |
| Image 1 | 85KB |
| | Length 120 Width 150 |
| Image 2 | 30KB |
| | Length 50 Width 40 |
| Image 3 | 80KB |
| | Length 300 Width 300 |
| Total Data Size | 200KB |

Fig. 2C

Converted Image

|  | Original | Middle 1 | Middle 2 | Middle 3 | Small |
|---|---|---|---|---|---|
| Image 1 | 85KB | 70KB | 50KB | 34KB | 20KB |
| Image 2 | 30KB | 24KB | 18KB | 12KB | 8KB |
| Image 3 | 80KB | 64KB | 48KB | 32KB | 19KB |
| Parameter | 100% | 80% | 60% | 40% | min |

Fig. 2D

Substitute Data

| White Image | Approx. 0.8KB |
|---|---|
| Substitute Text | Approx. 0.01KB |

WEB PAGE DISTRIBUTION SYSTEM

TECHNICAL FIELD

This invention relates to a Web page distribution system that converts Web pages into converted Web pages in accordance with capabilities of a destination device to which the Web pages is to be distributed, and transmits the converted Web pages to the destination device.

BACKGROUND

Generally, destination devices, such as mobile phones, to which Web pages to be distributed, may require different output conditions on a receivable Web page, such as description language used to describe a Web page, saving format of Web page component data such as image data configuring a Web page, total data size of a Web page that is a sum of data size of document part of the Web page and data size of component part of the Web page, and display size that is limited by a size of display device of a destination device.

For example, a simple Web page, that contains just a document without any special font attribute and with no accompanying image data, may meet all of the above mentioned output conditions.

Some of destination devices may be capable of interpreting Web pages with rich contents such as large number of images, movies, animations, advanced layouts such multiple columns, and so on. In general, users of destination devices with such a high capabilities expect to browse Web pages with rich contents. Accordingly, if it is allowed to distribute Web pages with rich contents, the Web pages can attract more users of high-spec destination devices.

However, it is impossible to prepare Web pages with rich contents that meet all possible output conditions that may be required by any destination device. Accordingly, when the same Web pages with rich contents are distributed to destination devices with different capabilities, some of the destination devices cannot display the Web pages with rich contents.

If different versions of same Web pages with rich contents are prepared to meet the output conditions of each of different types of destination devices, the above-mentioned problem is solved. However, the solution requires for hosts of Web pages to prepare a large number of different versions of the Web pages in accordance with number of different possible output conditions that may be required by any destination device, and it is a heavy burden of the hosts of Web pages.

In the above-explained situation, a Web page distribution system that automatically converts Web pages to make the Web pages meet output conditions required by destination devices of the Web pages is proposed. (See, for example, Patent Literature 1.) The Web page distribution system has a distribution sever and a relay sever. Hosts of Web pages with rich contents are required to register only the original version of their Web pages to the distribution server. When the relay server relays distributions of Web pages from the distribution server to destination devices of the Web pages, the relay server automatically converts the original version of Web pages to a converted version of Web pages that meet output conditions required by the destination devices.

In the conversion of Web pages at the relay server, conversions between description languages of the Web pages, for example, conversions of saving formats of Web page component data such as image data, conversions of total data sizes of the Web pages, namely sums of data size of document part and data size of component part of the Web pages, and conversions of display sizes of Web page components such as image are executed.

As one of the methods for converting total data sizes of Web pages, i.e. sums of data size of document part and data size of component part of the Web pages, for example, Patent Literature 1 proposes a method to reduce a total data size of Web page by dividing the Web page into plural small Web pages. According to the method, the divided Web pages can be distributed one by one to a destination device, and total data size of a Web page distributed to the destination device at the same time could be reduced. As another method for converting total data sizes of Web pages, for example, Patent Literature 2 proposes a method to reduce a total data size of Web page by executing image conversion processing to make a display size of Web page content (image) smaller, to degrade quality, such as number of colors, of Web page content (image), and so on.

SUMMARY OF THE INVENTION

Historically, attention has not been paid to data size of each Web page component data. In such methods, document parts of Web pages are modified to change the display sizes of images in the Web pages in accordance with capabilities of destination devices, and image data itself is not changed. Accordingly, sizes of image data are not reduced. Therefore, when a data size of one set of image data is larger than a data capacity of a destination device, the destination device cannot display the image.

Moreover, according to such known methods, when a size of one set of image data is smaller than the data capacity of the destination device, and a sum of sizes of two sets of image data is larger than the data capacity, each of the two images are displayed in different divided Web pages. In the case, a user of the destination device may feel inconvenient since it is difficult for the user to understand the whole structure of the original Web page from many small divided Web pages.

According to these proposed methods, data size of each of image data is converted, but data size of document part of a Web page is not changed. Accordingly, total data size of a Web page including data size of document part may exceeds the data capacity of the destination device, and the destination device may not display the Web page.

Moreover, in these known methods, total sum of data sizes of converted image data sets in a Web page is not checked. Accordingly, total data size of the converted Web page that is a sum of data size of document part and data sizes of converted image data sets may exceed the data capacity of the destination device, and the destination device may not display the Web page.

In addition, attention has not been paid to load distribution at the relay server. In general, load distribution at a relay server is achieved by installing plural relay servers and one load balancing server between a distribution server and destination devices. From a destination device, components of the system is connected in the following order:

destination device, load balancing server, selected one of plural relay servers, and selected one of plural distribution servers.

An outline of general flow of load distribution processes will be explained here. In the above-explained system, each time when the load balancing server receives a request for a certain Web page from a destination device, the load balancing server selects one of the plural relay servers, and relays the request to the selected relay server. The selected relay server further relays the request to one of the distribution servers, and receives a Web page transmitted from the distribution server in response to the request. When the relay server receives the Web page, the relay server converts the Web page in accordance with capability of the destination device, and transmits the converted version of Web page to the load balancing server. The load balancing server relays the converted version of Web page from the relay server to the destination device.

When the distributed Web page is accompanied by rich contents, plural times of data communications are usually required between the distribution server and the destination device. Since such a Web page usually contains document part and one or more component data sets of Web page such as images, and each of the document part and component data sets needs separate data communications between the distribution server and the destination device. Accordingly, first the document part of Web page is distributed to the destination device, and then component parts of Web page are distributed to the destination device one by one.

As explained above, the load balancing server selects one of the plural relay servers each time when the load balancing server receives a request for a certain Web page from a destination device, and relays the request to the selected relay server. Accordingly, a relay server that relays a document part of a Web page and a relay server that relays a component part such as image of the same Web page may not be different. From a view point of efficiency of load distribution, it is preferable for different relay servers to relay the document part and each of the component parts.

A relay server that reduces total data size of a Web page by executing image conversion processing to Web page component data (image data), such as a relay server, analyzes Web page document data when the relay server relays the Web page document data, i.e. when the relay server executes the first data communication among a series of plural data communications for relaying each component of the Web page, lists up all of the Web page component data sets (image data sets) in the Web page, obtains all of the Web page component data sets from any one of the distribution servers, and applies image conversion processing to the data sets, in advance. Then, the relay server transmits the Web page component data sets (image data sets) that were obtained and converted in advance to the destination device that requests the Web page, without further accessing the distribution servers.

By obtaining the Web page component data sets (image data sets) in advance, the total time for completing transmits of all of the data sets of Web page, i.e. the Web page text data set and all of the Web page component data sets, can be shortened compared to obtaining and converting each of the Web page component data sets each time when a certain Web page component data set is requested from the destination device.

When the relay server to obtain and convert all of the Web page component data sets in advance, the destination device receives all of the converted Web page component data sets from the same relay server, since the converted Web page component data sets are available only from the relay server that converted the Web page document data.

On the other hand, a load balancing server does not care whether a relay server that relays a Web page text data set and relay servers that relay Web page component data sets (image data sets) are the same device or not. If it is necessary for one relay server to obtain and convert the Web page text data set and all of the Web page component data sets of the same Web page, process flows of the load balancing server and the relay servers must be modified. Moreover, when such a modification is made in the system, efficiency of load distribution becomes lower than that of a normal load distribution system.

Accordingly, an owner of Web page distribution system needs to bear a heavy burden of expenses to modify the system, and at the same time the owner has to accept the demerit that high efficiency of load distribution cannot be expected.

In the above explained situation, the present invention is aimed to provide a Web page distribution system that distributes Web pages meeting various output conditions required by each of destination devices.

To solve the above-mentioned problems, the present invention provides, as a first embodiment, a Web page distribution system comprising:

a distribution server (Web distribution server 1) having a communication unit (CPU executing processes in steps S108 and S204) that executes data communications via a network (Internet 3) and transmits a Web page data set (10), the Web page data set containing a Web page text data set (11) indicating a text described in a predetermined Web page description language and one or more Web page component data sets (image data sets 12) referred to by the text, and plural destination devices (mobile phones 2), each of the plural destination devices being capable of displaying a Web page in accordance with the Web page data set received from the distribution server via the network, each of the plural destination devices having a set of output conditions defining requirements on a Web page data set for letting a Web page displayed at the destination device, the distribution server having:

a specifying unit (CPU executing processes in step S101) that specifies one set of output conditions in accordance with a request for the Web page data set, the request being transmitted from one destination device among the plural destination devices, a judging unit (CPU executing processes in steps S102, S104 and S106) that judges whether the Web page data set meets the one set of output conditions specified by the specifying unit, and a converting unit (CPU executing processes in steps S103, S105, S107 and S203) that converts the Web page data set to a converted Web page data set meeting the one set of output conditions when the judging unit judges that the Web page data set fails to meet the one set of output conditions.

The present invention also provides, as a second embodiment, a Web page distribution system of the first embodiment, wherein:

the judging unit (CPU executing processes in step S106) judges that the Web page data set (10) fails to meet the one set of output conditions when a total data size of the Web page data set exceeds a predetermined maximum data size, and the converting unit (CPU executing processes in steps S103, S105, S107 and S203) has a data size minimizing unit (CPU executing processes in step S301) that converts at least one of the one or more Web page component data sets (image data sets 12) to a small sized Web page component data set (small sized image data set 13) with a small data size, and a text modifying unit (CPU executing processes in step S302) that converts the Web page text data set (11) to a modified Web page text data set indicating a text that originally refers to at least one of the one or more Web page component data sets to refer to at least one of the small sized Web page component data sets that are generated by the data size minimizing unit.

The present invention also provides, as a third embodiment, a Web page distribution system of any one of the first and the second embodiments, wherein:

the judging unit (CPU executing processes in step S106) judges that the Web page data set (10) fails to meet the one set of output conditions when a total data size of the Web page data set exceeds a predetermined maximum data size, and the converting unit (CPU executing processes in steps S103, S105, S107 and S203) has a data size minimizing unit (CPU executing processes in step S301) that converts at least one of the one or more Web page component data sets (image data sets 12) to a small sized Web page component data set (small sized image data set 13) with a small data size, a data size changing unit (CPU executing processes in step S304) that converts at least one of the one or more Web page component data sets to a middle sized Web page component data set (middle sized image data sets 14a to 15a) with a data size that is larger than a data size of the small sized Web page component data set and smaller than a data size of the Web page component data set, and a text modifying unit (CPU executing processes in step S305) that converts the Web page text data set (11) to a modified Web page text data set indicating a text that originally refers to at least one of the one or more Web page component data sets to refer to at least one of the small sized Web page component data sets or at least one of the middle sized Web page component data sets.

The present invention also provides, as a fourth embodiment, a Web page distribution system of the third embodiment, wherein:

the one or more Web page component data sets (image data sets 12) contained in the Web page data set (10) are plural, and the text modifying unit (CPU executing processes in step S302) converts the Web page text data set (11) by modifying the text that originally refers to at least one of the plural Web page component data sets to refer to at least one of the middle sized Web page component data sets (middle sized image data sets 14a to 15a) in an order of being displayed in a Web page at the one destination device (mobile phone 2).

The present invention also provides, as a fifth embodiment, a Web page distribution system of any one of the third and the fourth embodiments, wherein:

the data size changing unit (CPU executing processes in step S304) repeats the conversion from the one or more Web page component data sets (image data sets 12) to the middle sized Web page components data sets (middle sized image data sets 14a to 14b) without exceeding a predetermined maximum number of times of conversions.

The present invention also provides, as a sixth embodiment, a Web page distribution system of any one of the first to the fifth embodiments, wherein:

the judging unit (CPU executing processes in step S106) judges that the Web page data set (10) fails to meet the one set of output conditions when a total data size of the Web page data set exceeds a predetermined maximum data size, and the converting unit (CPU executing processes in steps S103, S105, S107 and S203) has a data size minimizing unit (CPU executing processes in step S301) that converts at least one of the one or more Web page component data sets (image data sets 12) to a small sized Web page component data set (small sized image data set 13) with a small data size, and a text modifying unit (CPU executing processes in step S308) that converts the Web page text data set (11) by modifying the text that originally refers to at least one of the plural Web page component data sets to refer to at least one of the small sized Web page component data sets or at least one of special sized Web page component data sets (white image data sets), each of the special sized Web page component data sets being prepared in advance with a data size smaller than a data size of a corresponding one of the small sized Web page component data sets.

The present invention also provides, as a seventh embodiment, a Web page distribution system of the sixth embodiment, wherein:

the one or more Web page component data sets (image data sets 12) contained in the Web page data set (10) are plural, and the text modifying unit (CPU executing processes in step S308) converts the Web page text data set (11) by modifying the text that originally refers to at least one of the plural Web page component data sets (image data sets 12) to refer to at least one of the special sized Web page component data sets (white image data sets) in an inverse order of being displayed in a Web page at the one destination device (mobile phone 2).

The present invention also provides, as an eighth embodiment, a Web page distribution system of any one of the sixth and the seventh embodiments, wherein:

a text modifying unit (CPU executing processes in step S311) that converts the Web page text data set (11) by modifying the text that originally refers to at least one of the plural Web page component data sets (image data sets 12) to refer to at least one of the small sized Web page component data sets (small sized image data sets 13), at least one of the special sized Web page component data sets (white image data sets), or at least one of substitute text data sets, each of the substitute text data sets being prepared in advance with a data size smaller than a data size of a corresponding one of the special sized Web page component data sets.

The present invention also provides, as a ninth embodiment, a Web page distribution system of the eighth embodiment, wherein:

the one or more Web page component data sets (image data sets 12) contained in the Web page data set (10) are plural, and the text modifying unit (CPU executing processes in step S311) converts the Web page text data set (11) by modifying the text that originally refers to at least one of the plural Web page component data sets (image data sets 12) to refer to at least one of the substitute text data sets in an inverse order of being displayed in a Web page at the one destination device (mobile phone 2).

The present invention also provides, as a tenth embodiment, a Web page distribution system of any one of the first to the ninth embodiments, wherein:

the judging unit (CPU executing processes in step S104) judges that the Web page data set fails to meet the one set of output conditions when a display size of any one of images indicated by the one or more Web page component data sets (image data sets 12) exceeds a predetermined maximum display size, and the converting unit (CPU executing processes in steps S103, S105, S107 and S203) has a display size reducing unit (CPU executing processes in step S105) that converts at least one of the one or more Web page component data sets (image data sets 12) to a small display sized Web page component data set (small sized image data sets 13) indicating an image with the predetermined maximum display size, and a text modifying unit (CPU executing processes in step S105) that converts the Web page text data set (11) to a modified Web page text data set indicating a text that originally refers to at least one of the one or more Web page component data sets to refer to at least one of the small display sized Web page component data sets.

The present invention also provides, as an eleventh embodiment, a Web page distribution system of any one of the first to the tenth embodiments, wherein:

the converting unit (CPU executing processes in steps S103, S105, S107 and S203) has a component data converting unit (CPU executing processes in steps S301 and S304) that converts at least one of the one or more Web page component data sets (image data sets 12) to a converted Web page component data set, and a text modifying unit (CPU executing processes in steps S105, S107, S302, S308, S311 and S305) that converts the Web page text data set (11) to a modified Web page text data set indicating a text that originally refers to at least one of the one or more Web page component data sets to refer to at least one of the converted Web page component data sets, and adds to the Web page text data set at least one parameter data set indicating a parameter to be used for a conversion executed by the component data converting unit to generate a converted Web page text data set, and the communication unit transmits the converted Web page text data set (Web page text data set 11 containing conversion parameters) in response to the request for the Web page data set (10) transmitted from the one destination device (mobile phone 2), and transmits the converted Web page component data set generated by the component data converting unit in response to a request for a Web page component data set with the parameter data set.

The present invention also provides, as a twelfth embodiment, a Web page distribution system of any one of the first to the eleventh embodiments, wherein:

the converting unit (CPU executing processes in steps S103, S105, S107 and S203) has a data storing unit that stores converted Web page component data sets (small sized image data sets 13, middle sized image data sets 14a to 14b) that are generated by the converting unit, and the converting unit (CPU executing processes in step S203 when a result of judgment made in step S202 is negative) converts one Web page component data set among the one or more Web page component data sets to generate a converted Web page component data set when the data storing unit does not store a converted Web page component data set generated from the one Web page component data set.

The present invention also provides, as a thirteenth embodiment, a Web page distribution system of any one of the first to the twelfth embodiments, wherein:

the judging unit (CPU executing processes in step S102) judges that the Web page data set fails to meet the one set of output conditions when the text indicated by the Web page document data (11) includes at least one of character strings that are predetermined as original character strings to be substituted with predetermined substitute character strings, and the converting unit (CPU executing processes in steps S103, S105, S107 and S203) has a text modifying unit (CPU executing processes in step S203) that converts the Web page text data set by substituting at least one of the original character strings with at least one of the substitute character strings that corresponds to the at least one of the original character strings without analyzing a context of the original text to generate a converted text described in a Web page description language that the one destination device can interprets.

The present invention also provides, as a fourteenth embodiment, a Web page distribution system of any one of the first to the thirteenth embodiments, wherein:

the distribution server (Web page distribution server 1) is realized by a computer that executes data processing following instructions in a Web page distribution server application of a prior art and instructions in an add-in program (text data conversion module 101, image data conversion module 102) combined to the Web page distribution server application.

In the Web page distribution system of the first embodiment of the present invention, a distribution server distributes a converted Web page data set meeting output conditions required by a destination device that request for the Web page.

In the Web page distribution system of the second embodiment of the present invention, the distribution server distributes a converted Web page data set that contains small sized Web page component data sets and that has a smaller data size than a data capacity of the destination device of the Web page.

In the Web page distribution system of the third embodiment of the present invention, the distribution server distributes a converted Web page data set containing, in addition to the small sized Web page component data sets, middle sized Web page component data sets with higher qualities than those of the small sized Web page component data sets. Accordingly, by the Web page distribution system, the destination device can receive a Web page containing Web page component data sets that have comparatively high quality, though the data size of the converted Web page data set is smaller than the data capacity of the destination device of the Web page.

In the Web page distribution system of the fourth embodiment of the present invention, the distribution server distributes a converted Web page data set containing, in addition to the small sized Web page component data sets, the middle sized Web page component data sets with higher qualities than those of the small sized Web page component data sets, in an order of being displayed in the Web page. Accordingly, by the Web page distribution system, the destination device can receive a Web page data set that contains Web page component data sets with comparatively high quality in respect of images that are shown in the upper part of the Web page and comparatively important, and that has a smaller data size than the data capacity of the destination device.

In the Web page distribution system of the fifth embodiment of the present invention, the distribution server executes conversions within a limited number of times, for example five times, in respect of one Web page data set to generate a converted Web page data set. Accordingly, by the Web page distribution system, a large number of Web page data sets that are converted so that they could meet output conditions of destination devices can be quickly distributed to the destination devices since the conversion processes for each Web page data set do not require a heavy burden or a long time.

In the Web page distribution system of the sixth embodiment of the present invention, the distribution server distributes a converted Web page data set containing, in addition to the small sized Web page component data sets, special sized Web page component data sets with smaller data sizes than those of the small sized Web page component data sets. Accordingly, by the Web page distribution system, the destination device can receive a converted Web page data set that has a smaller data size than the data capacity of the destination device.

In the Web page distribution system of the seventh embodiment of the present invention, the distribution server distributes a converted Web page data set containing, in addition to the small sized Web page component data sets, the special sized Web page component data sets with smaller data sizes than those of the small sized Web page component data sets, in an inverse order of being displayed in the Web page. Accordingly, by the Web page distribution system, the destination device can receive a Web page that does not show some of images in the lower part of the Web page that are comparatively unimportant, and that has a smaller data size than the data capacity of the destination device.

In the Web page distribution system of the eighth embodiment of the present invention, the distribution server distributes a converted Web page data set containing, in addition to the small sized Web page component data sets, the special sized Web page component data sets with smaller data sizes than those of the small sized Web page component data sets, and substitute text data sets with smaller data sizes than those of the special sized Web page component data sets. Accordingly, by the Web page distribution system, the destination device can receive a converted Web page data set that has a smaller data size than the data capacity of the destination device.

In the Web page distribution system of the ninth embodiment of the present invention, the distribution server distributes a converted Web page data set containing, in addition to the small sized Web page component data sets and the special sized Web page component data sets, the substitute text data sets with smaller data sizes than those of the special sized Web page component data sets, in an inverse order of being displayed in the Web page. Accordingly, by the Web page distribution system, the destination device can receive a Web page that does not show some of images in the lower part of the Web page that are comparatively unimportant, and that has a smaller data size than the data capacity of the destination device.

In the Web page distribution system of the tenth embodiment of the present invention, the distribution server distributes a Web page data set that contains Web page component data sets indicating images with original display sizes in respect of images with display sizes that are the same as or smaller than a maximum display size of the destination device, and contains converted Web page component data sets indicating images with display sizes that are the same as or smaller than the maximum display size in respect of images with display sizes that are larger than the maximum display size. Accordingly, by the Web page distribution system, the destination device can receive a Web page that shows images with their original display sizes in their original layouts, and that shows images with their converted display sizes in layouts different from their original layouts, so that they are shown in the limited display sizes. Namely, in the Web page displayed at the destination device, changes in the layouts of images are minimized under the condition of maximum display size.

In the Web page distribution system of the eleventh embodiment of the present invention, the distribution server that receives a request for a Web page component data set also receives a parameter data set indicating a parameter to be used for a conversion of the Web page component data set. Accordingly, even when a load balancing server is installed to the system and a distribution server receiving a request for a Web page component data set is different from a distribution server receiving a request for a Web page text data set, the distribution server receiving the request for the Web page component data set can convert the Web page component data set to generate a converted Web page component data set, and distributes the converted Web page component data set. Namely, the distribution server receiving the request for the Web page text data set and the distribution server receiving the request for the Web page component data set are not required to share the converted Web page component data set. In the result, an efficient load distribution can be achieved.

In the Web page distribution system of the twelfth embodiment of the present invention, the distribution server does not have to repeat conversion processes in respect of a Web page component data set that was converted in the past. Accordingly, total burden and total time required for conversions of Web page component data sets are reduced, and a large number of converted Web page data sets that meet output conditions of destination devices can be distributed quickly.

In the Web page distribution system of the thirteenth embodiment of the present, the distribution server generates a converted Web page text data set indicating a text described in a Web page description language that can be interpreted by each of destination devices by executing simple substitutions following a substitution table that indicates correspondences between original character strings and substitute character strings, and distributes the converted Web page text data set. Since no grammatical analysis is executed in the substitution processes, once the converted Web page text data set is generated, the converted Web page text data set may be used with high probability even after the original Web page text data set is edited to comply with grammatical rules of its Web page description language that are newly introduced or modified.

In the Web page distribution system of the fourteenth embodiment of the present, the distribution server is realized by an add-in program to a Web page distribution server program that is generally used. In other words, a general Web server can become the distribution server of the present invention by installing a module program to the general Web server. Accordingly, without installing new servers such as relay servers, the Web page distribution system that provides distribution of converted Web page data sets that meet output conditions of destination devices can be realized. Moreover, since total load can be distributed to each of plural distribution servers that are easily increased, load distribution can be easily achieved.

BRIEF DESCRIPTION OF DRAWINGS

FIG. 2A illustrates examples of output conditions of Web pages.

FIG. 2B illustrates examples of attributes of a Web page.

FIG. 2C illustrates examples of attributes of converted images in a Web page.

FIG. 2D illustrates examples of attributes of a white image and a substitute text used as substitutes of images in a Web page.

DETAILED DESCRIPTION OF EMBODIMENTS

Exemplary embodiments of the present invention are explained below.

Figure 1:
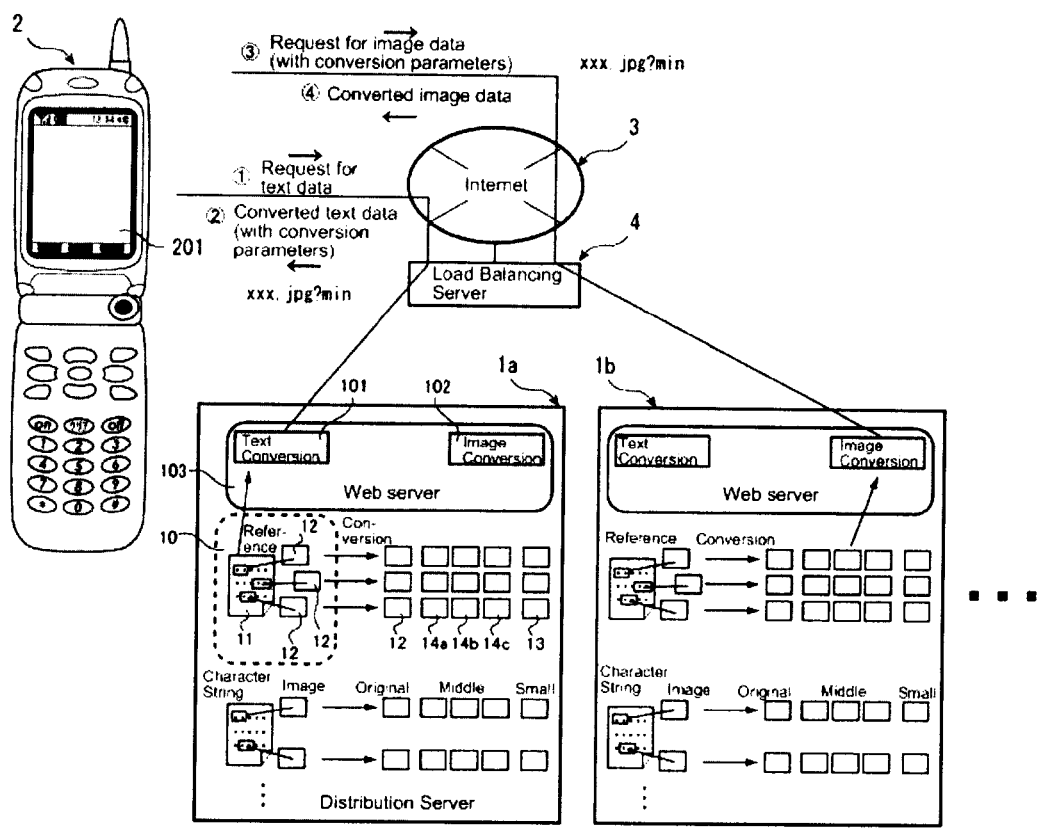
FIG. 1 illustrates an outline of a Web page distribution system of an exemplary embodiment of the present invention.

In the following explanation of the exemplary embodiments of the present invention, figures are used for facilitating understanding of the explanation. FIG. 1 illustrates a whole composition of a Web page distribution system in accordance with exemplary embodiment 1 of the present invention.

The Web page distribution system includes Web page distribution servers 1a, 1b, ..., that are connected to Internet 3, mobile phones 2 that are carried by users, load balancing server 4 that distributes load caused by data accessing to Web page distribution servers 1a, 1b, ....

The plural Web page distribution servers 1a, 1b, ... have the same constitution and functions, and they store the same sorts of data sets.

Web page distribution servers 1a, 1b, ..., are server computers that are generally known, and each of them has a CPU (Central Processing Unit, not shown), ROM (Read Only Memory, not shown), RAM (Random Access Memory, not shown), a communication unit (not shown) that conducts data communications with other devices via load balancing server 4, and a storing unit (not shown) that is a magnetic recording device such as a hard disk.

The storing unit (not shown) of each of Web page distribution servers 1a, 1b, ..., stores, as shown in FIG. 1, Web page data sets 10 including text data sets 11 and image data sets 12, Web server program 103 that instructs distributions of Web page data sets 10 in response to requests for Web page data sets 10 from mobile phones 2, text data conversion module 101 that is an add-in program combined with Web server program 103 and instructs conversions of text data sets 11, and image data conversion module 102 that instructs conversions of image data sets 12. The number of image data set(s) 12 may be zero or more.

Figure 3:
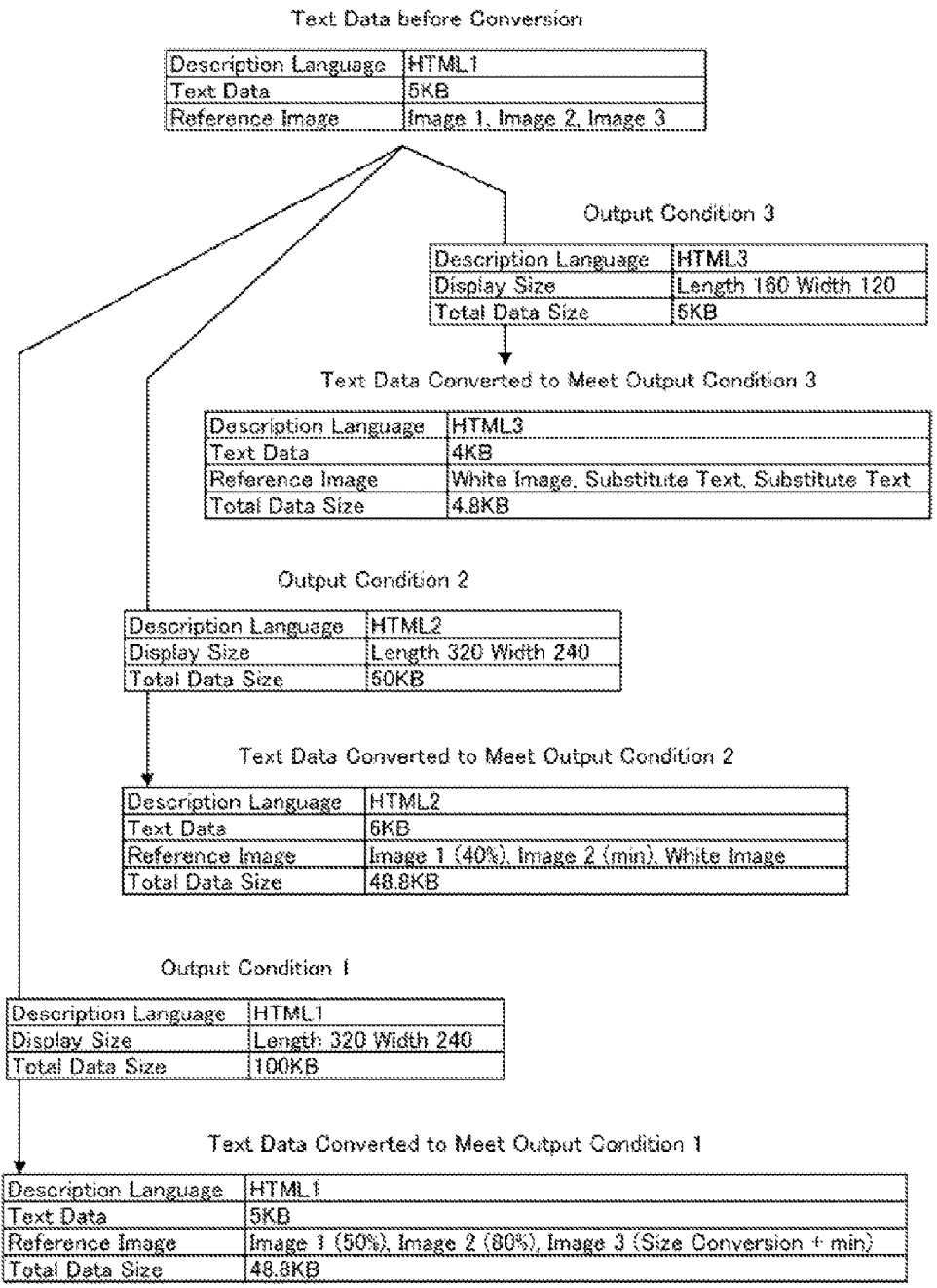
FIG. 3 illustrates examples of attributes of converted Web pages generated by the Web page distribution system of the exemplary embodiment of the present invention.

The storing unit (not shown) of each of Web page distribution servers 1a, 1b, ..., also stores terminal device data sets that indicate output conditions with regard to mobile phones 2. Each of the terminal device data sets includes device model identifying data set identifying a device model of mobile phone 2 such as a model number, and output condition data set in association with the device model identifying data set. The output condition data set will be explained later with reference to FIG. 3A.

Image data sets 12 play roles of the Web page component data sets of the present invention. Text data conversion module 101 plays a role of the text modifying unit of the present invention. Image data conversion module 102 plays roles of the data size minimizing unit and the data size changing unit. Web server program 103 plays a role of a normal program that instructs distributions of Web page data sets of the present invention.

Each of mobile phones 2 is a normal mobile phone that primarily has CPU (Central Processing Unit, not shown), ROM (Read Only Memory, not shown), RAM (Random Access Memory, not shown), a communication unit (not shown) that conducts data communications with other devices via Internet 3, and displaying unit 201 that is a display device such as a liquid crystal display device.

The storing unit (ROM, not shown) of each of mobile phones 2 stores a Web browser program that instructs mobile phone 2 to transmit distribution requests for Web page data sets 10 to Web page distribution servers 1a, 1b, ..., and to display Web pages following received Web page data sets 10 transmitted in response to the requests.

Load balancing server 4 a special computer for server functions that can perform high-speed processing and that primarily has CPU (Central Processing Unit, now shown), ROM (Read Only Memory, not shown), RAM (Random Access Memory, not shown), a communication unit (not shown) that conducts data communications with other devices via Internet 3, and a storing unit (not shown) that is a magnetic recording device such as a hard disk. Load balancing server 4 is generally sold as an expensive load balancing device that is composed of dedicated hardware.

The storing unit (not shown) of load balancing server 4 stores a load distribution program that instructs load balancing server 4 to distribute requests for distributing Web page data sets 10 sent from mobile phones 2 to Web page distribution servers 1a, 1b, ..., in accordance with predetermined criteria. The predetermined criteria include, for example, balance of numbers of data accesses to each of Web page distribution servers 1a, 1b, ..., speeds of data processing of them, etc.

Load distribution function is a function that is usually utilized when the system needs to handle a large number of distribution requests for Web page data sets 10 at the same time. For example, when Web page distribution servers 1 are two, each of them is required to handle only a half of the distribution requests.

Web page data sets 10 of the present embodiment are explained below.

Each of Web page data sets 10 includes text data set 11 and image data sets 12. The number of image data sets 12 may be zero or more. Text data set 11 indicates a text that is described in a predetermined Web page description language such as HTML (HyperText Markup Language). In the Web page description language (such as HTML), image data sets 12 indicating images included in a Web page are described as referred data sets by use of IMG tags.

Distribution requests for Web page data sets 10 of the present embodiment are explained below.

In accordance with instructions of the Web browser program, a mobile phone 2 transmits a distribution request for a Web page data set to Web server 103 in response to a certain operation made to the mobile phone 2 by a user of the mobile phone 2 as shown in FIG. 1. The distribution request includes data that specifies a certain Web page data set 10 in Internet 3 (such as URL, Universal Resource Locator). Web server 103 specifies the certain Web page data set 10 on the basis of the data specifying Web page data set 10 (URL). Then, Web server 103 specifies a text data set 11 included in the specified Web page data set 10, and transmits the specified text data set 11 to the mobile phone 2.

The mobile phone 2 following instructions of the Web browser program receives the text data set 11, and transmits distribution requests for image data sets 12 to Web server 103 when the text data set 11 includes references of image data sets (IMG tags) to the image data sets 12. Each of the references of image data sets (IMG tags) includes data (URL) specifying a name of data file (file name) of an image data set 12. Each of the distribution requests for image data sets 12 transmitted from the mobile phone 2 includes a file name of an image data set.

Web server 103 specifies image data sets 12 on the basis of file names included in the distribution requests, and transmits the specified image data sets 12 to the mobile phone 2.

One distribution request is transmitted for one image data set 12. Accordingly, the same number of data communications as the number of images included a Web page shown in accordance with a Web page data set 10 are conducted between the mobile phone 2 and Web server 103.

In short, a distribution request for a Web page data set 10 is comprised of a distribution request for text data set 11 and a distribution request for image data sets 12.

Load distribution of distribution requests for Web page data sets 10 of the present embodiment is explained below.

Load balancing server 4 selects one of Web page distribution servers 1a, 1b, . . . , as a destination of a distribution request, each time when load balancing server 4 receives a distribution request for a text data set 11 or a distribution request for an image data set 12. Accordingly, as shown in FIG. 1, a Web page distribution server 1 that handles a distribution request for a text data set 11 and a Web page distribution server 1 that handles a distribution request for an image data set 12 may be different. For example, Web page distribution server 1a may handle a distribution request for a text data set 11, Web page distribution server 1b may handle a distribution request of a first image data set 12, and Web page distribution server 1a may handle a distribution request for a second image data set 12, etc.

Output conditions for Web page data sets 10 of the present embodiment are explained below.

A Web page is shown by the Web browser function of mobile phone 2 following instructions indicated by a Web page data set 10. Technologies used for producing mobile phones 2 have been constantly improved, and therefore, performances of hardware such as CPUs (not shown), RAMs (not shown) and ROMs (not shown) of old models, current models and future models of mobile phones 2 are different from one another.

Moreover, programs installed to mobile phones 2 are designed to meet with hardware configurations of mobile phones 2, and therefore, programs installed to different mobile phones 2 having different hardware become different from each other. Accordingly, for example, a Web browser of a mobile phone 2 that has a lower performance can handle only a Web page data set that has a smaller total data size, and a mobile phone 2 that has a smaller display size cannot display an image with a larger display size in one screen.

Moreover, programs installed to mobile phones 2 may be designed separately by different companies to meet with conditions given by, for example, different manufactures of mobile phones 2. Accordingly, for example, specifications and requirements of Web page description languages given for two mobile phones 2 that are designed to access to different mobile communication networks managed by different carriers may be different.

Namely, one Web page data set 10 that can be interpreted by a Web browser function of one mobile phone 2 to show a Web page may not be interpreted by a Web browser function of another mobile phone 2. In other words, different output conditions may be required on each of different models of mobile phone 2 having a Web browser function.

In the present embodiment, each of output conditions on Web page data sets 10 consists of, for example, a Web page description language, a size of display unit 201 (resolution), and a maximum total size of a Web page data set 10 that can be handled by the mobile phone 2. A total size of a Web page data set 10 is a sum of a data size of a text data set 11 and data sizes of image data sets 12, a number of which may be zero or more, of the Web page data set 10.

Web page data sets 10 and output conditions of them of the present embodiment are further explained below.

FIG. 2B shows an example of a set of attributes of Web page data sets 10. In connection with the Web page data set 10 shown in FIG. 2B, a description language of the Web page data set 10 is HTML1, a data size of a text data set 11 contained in the Web page data set 10 is 5 KB (kilo bytes), a data size of a first image data set 12 referred to by the text data set 11 is 85 KB, a display size of an image indicated by the first image data set 12 is 120 pixels length and 150 pixels width, a data size of a second image data set 12 referred to by the text data set 11 is 30 KB, a display size of an image indicated by the second image data set 12 is 50 pixels length and 40 pixels width, a data size of a third image data set 12 referred to by the text data set 11 is 80 KB, a display size of an image indicated by the third image data set 12 is 300 pixels length and 300 pixels width, and a total data size of the Web page data set 10 is 200 KB.

Three exemplary sets of output conditions of Web page data sets 10 for mobile phones 2 are explained below.

As shown in FIG. 2A, according to the first set of output conditions, a required Web page description language is HTML1, a required display size is 320 pixels length and 240 pixels width, and a required maximum total data size is 100 KB. Under the conditions, the Web page data set 10 shown in FIG. 2B does not meet the requirements in respect that the width of display size of the third image is too large (300 pixels length/300 pixels width) and the total data size is too large (200 KB).

Accordingly, mobile phones 2 with the first set of output conditions usually output error messages when they try to display the second image in the Web page in accordance with the Web page data set 10 shown in FIG. 2B.

As shown in FIG. 2A, according to the second set of output conditions, a required Web page description language is HTML2, a required display size is 320 pixels length and 240 pixels width, and a required maximum total data size is 50 KB. Under the conditions, the Web page data set 10 shown in FIG. 2B does not meet the requirements in respect that the Web page description language is different (HTML2), the width of display size of the third image is too large (300 pixels length/300 pixels width), and the total data size is too large (200 KB).

Accordingly, mobile phones 2 with the second set of output conditions usually display only some parts of the Web page that are shown following instructions commonly used in both of HTML1 and HTML2 and/or display a screen with a layout that is different from the original one, as well as they output error messages when they try to display the first image in the Web page in accordance with the Web page data set 10 shown in FIG. 2B.

As shown in FIG. 2A, according to the third set of output conditions, a required Web page description language is HTML3, a required display size is 160 pixels length and 120 pixels width, and a required maximum total data size is 5 KB. Under the conditions, the Web page data set 10 shown in FIG. 2B does not meet the requirements in respect that the Web page description language is different (HTML3), the width of display size of the first image is too large (120 pixels length/ 150 pixels width), the width of display size of the third image is too large (300 pixels length/300 pixels width), and the total data size is too large (200 KB).

Accordingly, mobile phones 2 with the third set of output conditions usually display only some parts of the Web page that are shown following instructions commonly used in both of HTML1 and HTML3 and/or display a screen with a layout that is different from the original one, as well as they output error messages when they try to display the first image in the Web page in accordance with the Web page data set 10 shown in FIG. 2B.

To display the Web page completely in accordance with the Web page data set 10 shown in FIG. 2B, it is necessary to convert the original Web page data set 10 to a converted Web page data set that meets the output conditions of mobile phone 2 in respect of each of mobile phones 2. More concretely, a conversion of the text data set 11 (text conversion) and conversions of the image data sets 12 (image conversions) in the Web page data set 10 are required.

A series of processes for a conversion of a Web page data set in the present embodiment are explained below.

First, a series of processes for a text conversion executed in accordance with instructions of text data conversion module 101 are explained below.

A text conversion in the present embodiment primarily contains two parts of conversion processes. The first part of conversion processes are for a conversion of Web page description languages of the text data set 11, and the second part of conversion processes are for conversions of references (IMG tags) to image data sets in the text data set 11.

In the first part of the conversion processes for a conversion of Web page description languages of the text data set 11, some character strings indicated by the text data set 11 are converted to their substitute character strings following a Web page description language of a target mobile phone 2.

More concretely, a substitute table listing original character strings in accordance with an original Web page description language and their substitute character strings in accordance with a substitute Web page description language is prepared in advance, and the substitutions of character strings are executed on the basis of the substitute table.

The original character strings in the substitute table are selected, for example, by providers of Web page distribution servers 1a, 1b, ..., from among character strings used in text data sets 10 of Web page data sets 10 distributed from the Web page distribution servers based on specifications of Web page description languages used for the original text data sets 10 and specifications of other Web page description languages possibly adopted in mobile phones 2. In the present embodiment, the original Web page description language is HTML1, and the other Web page description languages possibly adopted in mobile phones 2 are HTML2 and HTML3. In this case, the original character strings to be converted are selected from among character strings used in HTML1.

It should be noted that, in the present embodiment, the text conversion processes are executed only by matching character strings without grammatical analysis of the original text indicated by the text data set 11. Such grammatical analysis cannot be realized by simply using the substitute table but they require a complex program that can instruct analysis of contexts including the original character strings, etc.

Since the simple method of text conversion using the substitute table is adopted in the present invention, it has a merit that there is no need to modify a program for analyzing grammars of texts indicated by text data sets 11 even when specifications of a Web page description language used for describing the texts are changed and only some modifications to the substitute table are required.

In the second part of the conversion processes for conversions of references to images (IMG tags) in the text indicated by the text data set 11, a total of a data size of the text data set 11 and data sizes of image data sets 12 referred to by the references (IMG tags) in the text data set 11 is calculated, and it is judged whether the calculated total data size exceeds the maximum total size of the target mobile phone 2. In a case when the total data size does not exceed the maximum total data size, no conversion of references (IMG tags) is executed.

On the other hand, in a case when the total data size exceeds the maximum total data size, conversions of the image data sets 12 are actually executed as explained later and a total data size is checked on the basis of the converted image data sets, and the references (the IMG tags) in the text indicated by the text data set 11 is converted so that the text refers to the converted image data sets. More concrete explanation of the conversion of references to image data sets (IMG tags) will be given in a later part of this description. It should be noted that, in the present embodiment, conversions of image data sets are actually executed in respect of all of the images to check data sizes of the converted image data sets and a Web page data set 10 requiring a total data size less than the maximum total data size of the target mobile phone 2 is certainly generated even when the text data set 11 includes plural references to image data sets.

Next, a series of processes for image conversions executed in accordance with instructions of image data conversion module 102 are explained below.

In the image conversions of the present embodiment, qualities of images are converted to one of plural preset grades of quality. FIG. 2C shows an example of such a plural preset grades of quality. In accordance with the example shown in FIG. 2C, five grades of image quality are totally given, i.e. image data set 12 that is an image data set with the original image quality without conversion, middle sized image data sets 14a to 14c that are image data set with image qualities categorized to a middle quality, and small sized image data set 13 that is an image data set with an image quality categorized to a low quality.

Any number of grades of image quality may be categorized to the middle quality.

Small sized image data set 13 indicates an image with the lowest image quality to minimize its data size. Small sized image data set 13 is actually generated in accordance with parameters of a format in which the image data set is saved, such as 1% degradation that means making the quality of image 1% lower than to the quality of the original image in JPEG (Joint Photographic Experts Group), 2 bits that means using only two bits for specifying colors in GIF (Graphics Interchange Format), etc. By the conversion to small sized image data set 13, for example, the data size of the first image is decreased from 85 KB to 20 KB, the data size of the second image is decreased from 30 KB to 8 KB, and the data size of the third image is decreased from 80 KB to 19 KB, as shown in FIG. 2C.

The extent to which the image quality should be degraded to reduce the data size may be determined, for example, the providers of Web page distribution servers 1a, 1b, ..., on their own criteria.

Middle sized image data sets 14a to 14c are image data sets with image quality that is higher than that of small sized image data set 13 and lower than that of image data set 12. Middle quality image data sets are also generated in accordance with parameters of formats in which the image data sets are saved, such as 0.2% to 0.6% degradation in JPEG (Joint Photographic Experts Group), etc. By the conversion to middle sized image data sets 14a to 14c, for example, the data size of the first image is decreased from 85 KB to 70 KB, 50 KB or 34 KB, the data size of the second image is decreased from 30 KB to 24 KB, 18 KB or 12 KB, and the data size of the third image is decreased from 80 KB to 64 KB, 48 KB or 19 KB, as shown in FIG. 2C.

The above explained conversions of image data sets may be executed at one of two timings. Namely, first, the image data conversions may be executed when Web page distribution servers 1a, 1b, ..., receives a distribution request for text data set 11 from a mobile phone 2 and calculates a total data size required for displaying a Web page, in response to the request. In the case, the image data conversion is executed in accordance with instructions of image data conversion module 102 that are called by instructions of text data conversion module 101. Second, the image data conversions may be executed when Web page distribution servers 1a, 1b, . . . , receives a distribution request for image data set 12 from a mobile phone 2 and distributes an image data set in response to the request. In the case, the image data conversion is executed in accordance with instructions of image data conversion module 102 that are directly called.

The storing unit (not shown) of each of Web page distribution servers 1a, 1b, . . . , stores image data sets 12, 12, 14a to 14c, and image data conversion module 102 instructs the Web page distribution server to generate the image data sets only when they are not saved in the storing unit.

In some cases, even after image data sets 12 are converted to small sized image data set 13 or middle sized image data sets 14a to 14c and the converted image data sets are referred to by text data set 11, the total data size required for displaying a Web page still exceeds the maximum total data size.

For example, when a target mobile phone 2 requires output condition 2 shown in FIG. 2A, a total data size of the text data set 11 of the Web page data set 10 and small sized image data sets 13 for the Web page data set 10 exceeds the maximum total data size of the target mobile phone 2.

In such a case, it is an option to drop the image from the Web page. However, when the image is dropped, the layout or design of Web page that is originally indicated by the Web page data set 10 cannot be maintained when the Web page is displayed in the target mobile phone 2.

In the above mentioned case, the references to the image data sets 12 (IMG tags) are modified so that they refer to white image data sets each of which indicates a white image with 1 pixel length and 1 pixel width having a really small data size. In the modification, display sizes of the white images are maintained as the same display sizes as those of the original images. Accordingly, the layout of the Web page is maintained when it is displayed in the target mobile phone 2 though the images are not shown in the Web page.

There are still some cases where a total data size required for displaying a Web page exceeds a maximum total data size of a target mobile phone 2 even when all of references to image data sets (IMG tags) are modified so that they refer to white image data sets.

For example, when a target mobile phone 2 requires output condition 3 shown in FIG. 2A, the data size of the text data set 11 of the Web page data set 10 is nearly equal to the maximum total data size of the target mobile phone 2, and there is no enough room for allowing any image data set 12 to be handled by the target mobile phone 2.

In the above mentioned case, the references to the image data sets 12 (IMG tags) are modified so that they refer to substitute text data sets each of which indicates a text of an explanation of the image to be substituted shown at the same position as that of the image in the Web page. A substitute text data set has a still smaller data size than that of a white data set. Accordingly, the explanations of the images are shown in the Web page in the target mobile phone 2 though the images are not shown and the original layout is not maintained.

In the present embodiment, a substitute text data set (ALT attribute) included in each of references to image data sets (IMG tags) that are originally included in text data set 11 is used as the above mentioned substitute text data set. When ALT attribute is not found in the original text data set 11, a default text data set indicating a general explanation such as "image 1" is used as the substitute text data set.\

A data size of a substitute text data set depends on a length of the text indicated by the substitute text data set. However, since one character requires only a several bytes of data size, a data size of a normal substitute text data set is estimated around ten bytes (0.01 KB) as shown in FIG. 2D.

Figure 4A:
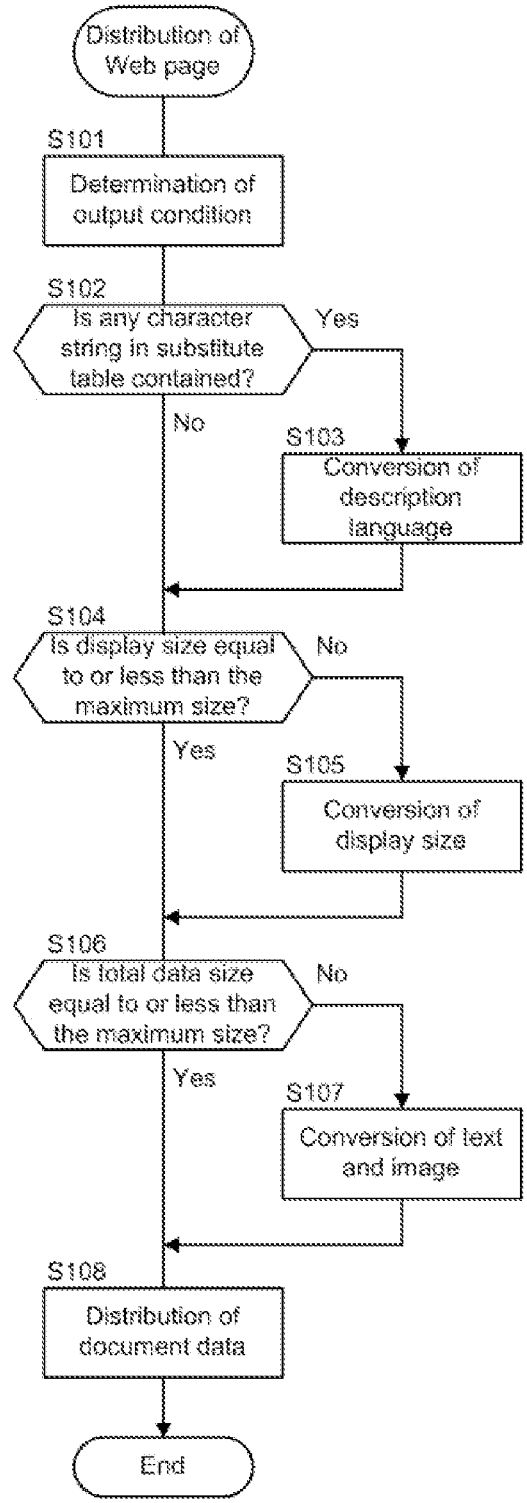
FIG. 4A illustrates a flow of processes for distributing Web pages in the exemplary embodiment of the present invention.

FIG. 4A shows a flow of processes executed by any one of Web page distribution servers 1a, 1b, . . . , for distributing a Web page data set 10 in response to a distribution request from a mobile phone 2.

As explained above, a distribution request for a Web page data set 10 consists of a distribution request for text data set 11 and distribution requests for image data sets 12, and the distribution request for text data set 11 is transmitted from a mobile phone 2 before the distribution requests for image data sets 12. Accordingly, a process for distributing a text data set 11 is executed first.

When one of Web page distribution server 1a, 1b, . . . , receives a request for Web page data set 10 from a mobile phone 2, the Web page distribution server 1 extracts a device model identifying data set identifying a device model of the mobile phone 2 from the distribution request for Web page data set 10, and specifies a set of output conditions of the device model of the mobile phone 2, in step S101.

In the next step, i.e. step S102, the Web page distribution server 1 selects a suitable substitute table of Web page description languages on the basis of information on the Web page description language of the mobile phone 2 indicated by the output conditions, and judges whether any of the original character strings in the selected substitute table is included in a text indicated by the text data set 11 that is to be distributed to the mobile phone 2.

When no original character string in the substitute table is included in the text, the Web page distribution server 1 proceeds to step S104.

When any original character string in the substitute table is included in the text indicated by the text data set 11 to be distributed to the mobile phone 2, the Web page distribution server 1 proceeds to step S103, and substitutes all character strings in the text that are also included in the substitute table as the original character strings with their corresponding substitute character strings. Then, Web page distribution server 1 proceeds to step S104.

In step S104, the Web page distribution server 1 specifies a maximum display size indicated by the output conditions, and judges whether all of display sizes of image data sets 12 that are referred to in the text data set 11 do not exceed the maximum display size.

In step S104, when all of display sizes of image data sets 12 do not exceed the maximum display size, the Web page distribution server 1 proceeds to step S106.

In step S104, when any one of display sizes of image data sets 12 exceeds the maximum display size, the Web page distribution server 1 proceeds to step S105 and executes image data conversions so that a display size of any of the converted image data set(s) does not exceed the maximum display size. Then, Web page distribution server 1 proceeds to step S106.

In step S106, the Web page distribution server 1 specifies a maximum data size indicated by the output conditions, and judges whether a total data size required to display the Web page, i.e. a sum of a data size of the text data set 11 to be distributed and data sizes of image data sets 12 referred to by the text data set 11, does not exceed the maximum data size.

In step S106, when the total data size does not exceed the maximum data size, the Web page distribution server 1 proceeds to step S108.

In step S106, when the total data size exceeds the maximum data size, the Web page distribution server 1 proceeds to step S107 and executes conversions of the text data set 11 and the image data sets 12. Details of the conversions of text data set and image data sets will be explained with reference to FIG. 5 in a later part of this description. After step S107, the Web page distribution server 1 proceeds to step S108.

In step S108, the Web page distribution server 1 distributes the converted text data set 11 that meets the output conditions to the mobile phone 2.

Figure 5:
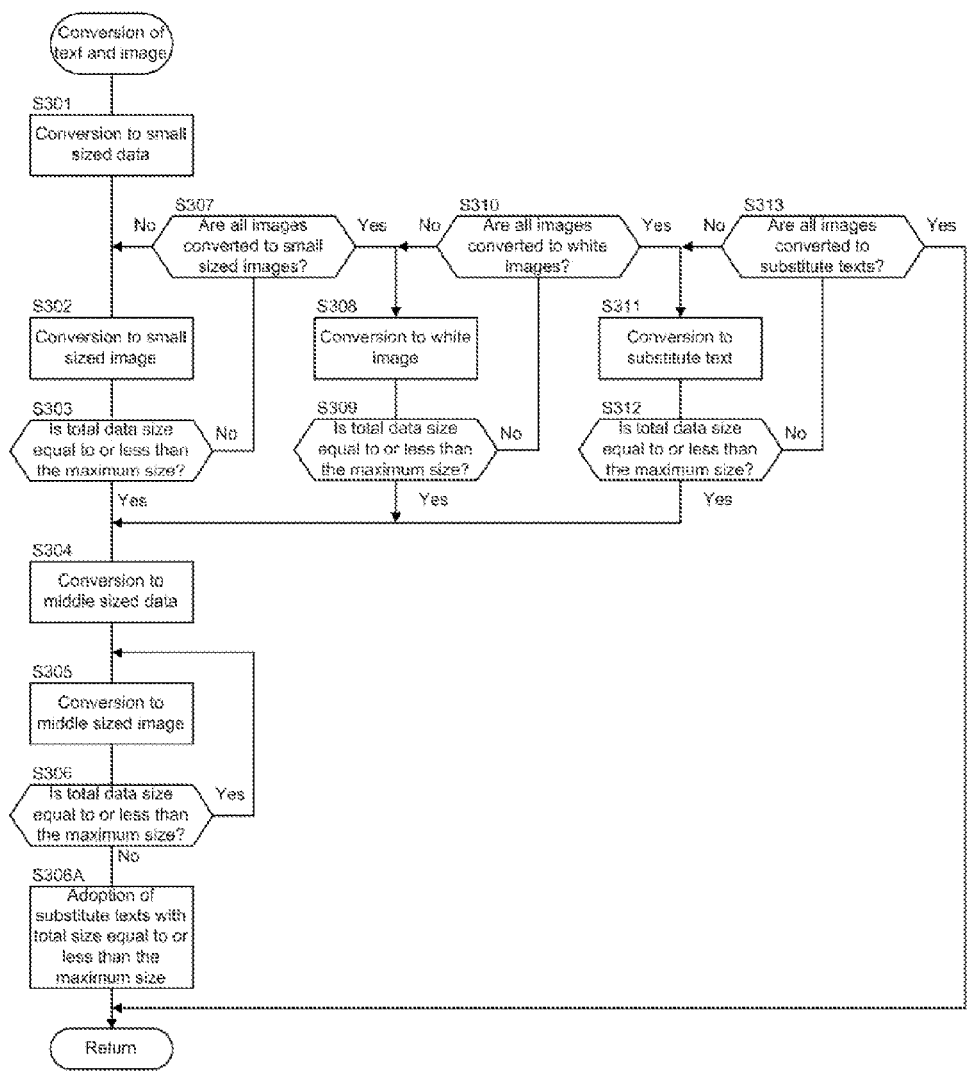
FIG. 5 illustrates a flow of processes for converting character strings and images in Web pages in the exemplary embodiment of the present invention.

FIG. 5 shows a flow of processes of conversions of the text data set and the image data sets executed in step S107

In step S301, the Web page distribution server 1 executes the small sized image data set conversions in connection with all of the image data sets 12 that are referred to by the text data set 11 of the Web page, and generates small sized image data sets 13. Then, the Web page distribution server 1 proceeds to step S302.

In step S302, the Web page distribution server 1 changes a reference to image data set 12 (IMG tag) in the text data set 11 so that it refers to a small sized image data set 13 converted from the image data set 12. In each step S302, the Web page distribution server 1 select one reference to an image data set 12 (IMG tag) in an inverse order of displays of images in the Web page, and replace the selected reference with a new reference to a small sized image data set 13.

Reference to image data sets (IMG tags) contained in text data set 11, which are described in a Web page description language, are explained below. Image data sets 12 indicate images and saved in data files. Accordingly, the references to the image data sets refer to the image data sets 12 by indicating file names of them. For example, when a file name of an original image data set is "xxx.jpg", a reference to the image data set is described as an IMG tag indicating the file name of image data set like "<img src="xxx.jpg">".

References to small sized image data sets 13 are explained below. Similarly to the reference to image data sets 12, references to small sized image data sets 13 are described as IMG tags indicating file names of the small sized image data sets 13. For example, when a file name of a small sized image data set 13 is "xxx_in.jpg", a reference to the small sized image data set 13 is described like "<img src="xxx_min.jpg">".

In the present embodiment, a file name of a small sized image data set is created by combining a file name of its original image data set and characters indicating a parameter used for the conversion to generate the small sized image data set. For example, when the parameter used for the conversion is "min" that specifies a conversion to generate a small sized image data set, a file name created for the small sized image data set is, for example, "xxx.jpg?min" and the reference to the small sized image data set (IMG tag) is described like <img src="xxx.jpg?min">.

In other words, in step S302, the file name contained in the reference to the image data set 12 (IMG tag) in the text data set 11 is replaced with a file name that is created by adding, to the original file name of image data set 12, characters identifying a parameter of conversion to generate a small sized image data set such as "?min".

In the next step, i.e. in step S303, the Web page distribution server 1 specifies a maximum data size indicated by the output conditions, and judges whether a total data size that is a sum of a data size of the text data set 11 to be distributed and data sizes of image data sets 12 and 13 referred to by the text data set 11, does not exceed the maximum data size.

In step S303, when the total data size does not exceed the maximum data size, the Web page distribution server 1 proceeds to step S304.

In step S303, when the total data size exceeds the maximum data size, the Web page distribution server 1 proceeds to step S307 and checks whether all of the original references to the image data sets 12 (IMG tags) in the text data set 11 have already been replaced with new references to image data sets 13.

In step S307, when all of the original references have already been replaced with the new references, the Web page distribution server 1 proceeds to step S307.

In step S307, when some of the original references have not been replaced with the new references yet, the Web page distribution server 1 returns to step S302, and replaces the next original reference to image data set 12 (IMG tag) in the inverse order of display of images in the Web page with a new reference to image data set 13. Then, the Web page distribution server 1 repeats step S303 and the steps following step S303.

In each step S308, the Web page distribution server 1 selects one reference to a small sized image data set (IMG tag) in the text data set 11 in the inverse order of displays of images in the Web page, and replaces the reference to the small sized image data set with a reference to a white image data set. Namely, each time when step S308 is executed, a reference to small sized image data sets 13 (IMG tag) in the text data set 11 is replaced with a reference to a white image data set one by one in the inverse order.

When a file name of an original image data set is "xxx.jpg" and characters indicating a parameter specifying a conversion to generate a white image data set is "white", the new reference to the white image data set (IMG tag) is described like <img src="xxx.jpg?white">.

Instead of using different file names for each of white image data sets referred to in the text data set 11, one predetermined file name may be commonly used for all of the white image data sets referred to in the text data set 11.

In the next step, i.e. in step S309, the Web page distribution server 1 specifies the maximum data size indicated by the output conditions, and judges whether a total data size, that is a sum of a data size of the text data set 11 to be distributed and data sizes of image data sets 13 and white image data sets referred to by the text data set 11, does not exceed the maximum data size.

In step S309, when the total data size does not exceed the maximum data size, the Web page distribution server 1 proceeds to step S304.

In step S309, when the total data size exceeds the maximum data size, the Web page distribution server 1 proceeds to step S310 and checks whether all of the references to the image data sets 13 (IMG tags) in the text data set 11 have already been replaced with references to white image data sets.

In step S310, when all of the references have already been replaced with the references to the white image data sets, the Web page distribution server 1 proceeds to step S311.

In step S310, when some of the references have not been replaced with the references to the white image data sets yet, the Web page distribution server 1 returns to step S308, and replaces the next reference to image data set 13 (IMG tag) in the inverse order of display of images in the Web page with a new reference to white image data set. Then, the Web page distribution server 1 repeats step S309 and the steps following step S309.

In each step S311, the Web page distribution server 1 selects one reference to a white image data set (IMG tag) in the text data set 11 in the inverse order of displays of images in the Web page, and replaces the reference to the white image data set with a reference to a substitute text data set. Namely, each time when step S311 is executed, the reference to the white image data set (IMG tag) in the text data set 11 is replaced with a reference to a substitute text data set one by one in the inverse order.

Substitute text data sets are explained below. As explained above, references to image data set (IMG tag) is described in a text data set 11 in a Web page description language such as <img src="xxx.jpg">. In the Web page description language, a reference to image data set (IMG tag) may contain a substitute text data (ALT attribute) indicating explanations of the referred image data set. For example, when an image data set identified by a file name "xxx.jpg" indicates a photo of an office room, a reference to the image data set (IMG tag) may contain a text data set indicating, for example, "photo of office space" as a substitute text data set like <img src="xxx.jpg" alt="photo of office space">.

Accordingly, a conversion from a reference to an image data set (IMG tag) to a substitute text data set is actually a replacement of the reference to the image data set (IMG tag) such as <img src="xxx.jpg" alt="photo of office space"> with the text data set contained in the reference such as "photo of office space".

When the reference to an image data set (IMG tag) does not contain a substitute text data (ALT attribute), a default text data set indicating, for example, "image 1" may be used as the substitute text data set.

In the next step, i.e. in step S312, the Web page distribution server 1 specifies the maximum data size indicated by the output conditions, and judges whether a total data size, that is a sum of a data size of the text data set 11 to be distributed, which contains substitute text data sets, and data sizes of image data sets 13 and white image data sets referred to by the text data set 11, does not exceed the maximum data size.

In step S312, when the total data size does not exceed the maximum data size, the Web page distribution server 1 proceeds to step S304.

In step S312, when the total data size exceeds the maximum data size, the Web page distribution server 1 proceeds to step S313 and checks whether all of the references to image data sets (IMG tags) in the text data set 11 have already been replaced with substitute text data sets.

In step S313, when all of the references have already been replaced with the substitute text data sets, the Web page distribution server 1 exits the series of processes for converting the Web page data set 10, since there is no way to further decrease the total data size.

In step S313, when some of the references have not been replaced with the substitute text data sets yet, the Web page distribution server 1 returns to step S311, and replaces the next reference to image data set (IMG tag) in the inverse order of display of images in the Web page with a substitute text data set. Then, the Web page distribution server 1 repeats step S312 and the steps following step S312.

In step S304, the Web page distribution server 1 converts all of the image data sets 12 referred to by the text data set 11 to generates middle sized image data sets 14a to 14c. Then, the Web page distribution server 1 proceeds to step S305. As explained above, for each of the image data sets 12, middle sized image data sets 14a to 14c each of which has different image quality from one another.

In step S305, the Web page distribution server 1 replaces the references to image data sets (IMG tags) contained in the text data set 11 with new references to small sized image data sets 13 and to white image data sets, and then replaces the substitute text data sets with references to middle sized image data sets 14a to 14c. Each time when step S305 is executed, the original references to image data sets (IMG tags) are replaces with new references to the middle sized image data sets 14a to 14c one by one in an order of displays of images and in an order of image qualities of the middle sized image data sets 14a to 14c.

More concretely, in step S305 of the first turn, a reference to an image data set whose image is to be displayed first in the Web page is replaced with a reference to a middle sized image data set 14a that has better quality than a middle sized image data set 14b, in step S305 in the second turn, the reference to the middle sized image data set 14a whose image is to be displayed first in the Web page is replaced with a reference to a middle sized image data set 14b that has better quality than a middle sized image data set 14c, and step S305 may be repeated in the similar way as explained with regard to steps S305 of the first turn and the second turn.

When a reference to an image data set (IMG tag) is replaced with a new reference to one of middle sized data sets 14a to 14c, if a file name of the original image data set 12 is "xxx.jpg" and a parameter specifying a conversion of an image data set to a middle sized image data set 14a with 80% quality of the original image data set 12 is "80", the original reference to the image data set 12 (IMG tag) is replaced with a new reference like "<img src="xxx.jpg?80">.

The above mentioned parameter is just an example of various kinds of parameters, and any other parameters may be used in references if they can specify contents of conversions.

In the next step, i.e. in step S306, the Web page distribution server 1 specifies the maximum data size indicated by the output conditions, and judges whether a total data size, that is a sum of a data size of the text data set 11 to be distributed, which contains substitute text data sets, and of data sizes of middle sized image data sets 14a to 14c, image data sets 13 and white image data sets, which are referred to by the text data set 11, does not exceed the maximum data size.

In step S306, when the total data size does not exceed the maximum data size, the Web page distribution server 1 returns to step S305, selects the next reference to image data set (IMG tag) in the orders of display of images in the Web page with a substitute text data set and of image qualities of the middle sized image data sets 14a to 14c, and replace the selected reference with a new reference to one of middle sized image data set 14a to 14c. Then, the Web page distribution server 1 repeats step S306 and the steps following step S306.

In step S306, when the total data size exceeds the maximum data size, the Web page distribution server 1 proceeds to step S306A, and adopts the last version of text data set 11 that was judged that the total data size does not exceed the maximum data size as text data set 11 to be sent to the mobile phone 2. The adopted version of text data set 11 is arranged to contain references to image data sets (IMG tags) that indicate images displayed in the upper part of the Web page with the best image qualities under the condition of limitation of the total data size. Then, the Web page distribution server 1 exits the series of processes for converting the Web page data set 10.

In the embodiment explained above, the Web page distribution server 1 selects one of middle sized image data sets 14a to 14c as the image data set with the best image quality under the condition of limitation of the total data size, but the present invention should not be limited in this respect, and for example, the original image data set, i.e. image data set 12 may be selected instead of one of image data sets 14*a* to 14*c* if the total data size does not exceeds the maximum data size.

The adopted version of text data set 11 is distributed to the mobile phone 2 from the Web page distribution server 1. The Web browser function of mobile phone 2 interprets the text data set 11, and transmits distribution requests for image data sets 12, small sized image data sets 13, middle sized image data sets 14 and/or white image data sets that are referred to by the text indicated by the text data set 11, to Web page distribution servers 1*a*, 1*b*, . . . .

As explained above, in the references to image data sets (IMG tags) in the text data set 11 may contain parameters specifying sorts of conversions applied to the image data sets in their file names in the forms of combinations of file names of image data sets 12 as their original image data sets and the parameters. Accordingly, each of the distribution requests for image data sets may contain a file name of image data set 12 as an original image data set of the requested image data set and a parameter specifying a sort of conversion applied to the original image data set to generate the requested image data set.

Figure 4B:
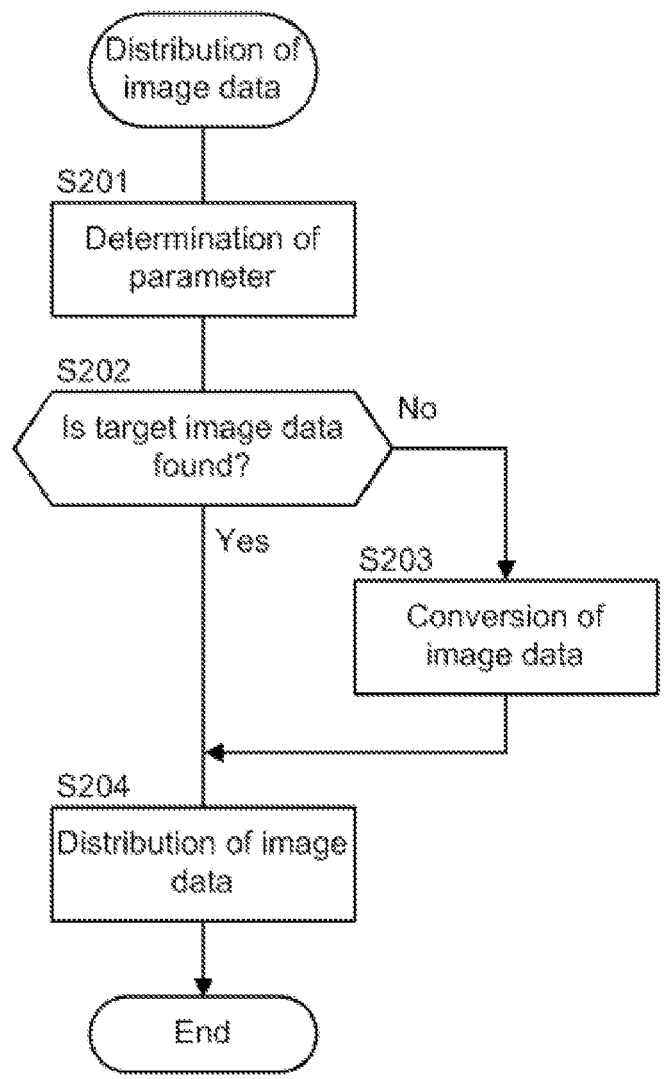
FIG. 4B illustrates a flow of processes for distributing images in Web pages in the exemplary embodiment of the present invention.

FIG. 4B shows a flow of processes executed by the Web page distribution server 1 that received a distribution request for an image data set for distributing the requested image data set to the mobile phone 2.

The Web page distribution server 1 proceeds to step S201, and specifies a file name of image data set 12 and a parameter of image data conversion that are contained in the distribution request for the image data set.

In the next step, i.e. in step S202, the Web page distribution server 1 judges whether a small sized image data set 13 or middle sized image data set 14*a* to 14*c* that is generated by applying a conversion specified by the parameter to the image data set 12 specified by the file name specified in step 201 is stored in the storing unit (not shown) of the Web page distribution server 1.

When the image data set is stored in the storing unit, the Web page distribution server 1 proceeds to step S204.

When the image data set is not stored in the storing unit, the Web page distribution server 1 proceeds to step S203, and converts the image data set 12 to generate one of a small sized image data set 13 or one of middle sized image data sets 14*a* to 14*c* in accordance with the parameter. The Web page distribution server 1 stores the generated image data set in its storing unit (not shown).

In the next step, i.e. in step S204, the Web page distribution server 1 distributes the generated image data set to the mobile phone 2, and exit the series of processes for distributing the requested image data set to the mobile phone 2.

It should be noted that any one of Web page distribution servers 1*a*, 1*b*, . . . , that receives a distribution request for an image data set can generate the requested image data set by executing required conversion and distribute the requested image data set to the mobile phone 2 since the distribution request contains a file name of an original image data set 12 and a parameter specifying a sort of conversion applied to the original image data set.

As explained above, the present embodiment provides a Web page distribution system that distributes Web page data sets that meet output conditions required for each of device models of target terminal devices.

The present embodiment also provides a Web page distribution system that distributes Web page data sets that require total data sizes not exceeding the maximum data sizes of target terminal devices to display a Web page, by referring to small sized image data sets that are converted from original image data sets so that their data sizes become smaller than those of their original image data sets.

The present embodiment also provides a Web page distribution system that distributes Web page data sets that avoids too much degradation of qualities of images in a Web page, as well as require total data sizes not exceeding the maximum data sizes of target terminal devices to display a Web page, by referring to, in addition to small sized image data sets that are converted from original image data sets so that their data sizes become smaller than those of their original image data sets, middle sized image data sets, that have better quality than small sized image data sets.

The present embodiment also provides a Web page distribution system that distributes Web page data sets that avoids too much degradation of qualities of images displayed in an upper part of Web page that are comparatively more important than those in the lower part, as well as require total data sizes not exceeding the maximum data sizes of target terminal devices to display a Web page, by referring to, in addition to small sized image data sets that are converted from original image data sets so that their data sizes become smaller than those of their original image data sets, middle sized image data sets, that have better quality than small sized image data sets, in an order of displays of the images under the limitation of total data size.

The present embodiment also provides a Web page distribution system that distributes a large number of Web page data sets that meet output conditions required for each of device models of target terminal devices at a high speed by limiting number of conversions conducted in connection with one Web page data set. For example, if only five conversions of image data set are conducted at Web page distribution servers in connection with one Web page data set, total burden and time required to execute the conversions of image data sets does not increase too much.

The present embodiment also provides a Web page distribution system that distributes Web page data sets that require total data sizes not exceeding the maximum data sizes of target terminal devices to display a Web page even when maximum data sizes of the target terminal devices are quite small, by referring to, in addition to small sized image data sets that are converted from original image data sets so that their data sizes become smaller than those of their original image data sets, white image data sets that have smaller data sizes than small sized image data sets.

The present embodiment also provides a Web page distribution system that distributes Web page data sets that require total data sizes not exceeding the maximum data sizes of target terminal devices to display a Web page even when maximum data sizes of the target terminal devices are really small, by referring to, in addition to small sized image data sets that are converted from original image data sets so that their data sizes become smaller than those of their original image data sets, white image data sets that have smaller data sizes than small sized image data sets in an inverse order of displays of images in a Web page. Since images displayed in the lower part of the Web page are probably less important than images displayed in the upper part of the Web page, influence of omissions of some of the images in the Web page can be minimized.

The present embodiment also provides a Web page distribution system that distributes Web page data sets that require total data sizes not exceeding the maximum data sizes of target terminal devices to display a Web page even when maximum data sizes of the target terminal devices are really small, as well as avoid too much degradation of the Web pages shown in accordance with the Web page data sets, by referring to, in addition to small sized image data sets that are converted from original image data sets so that their data sizes become smaller than those of their original image data sets, white image data sets that have smaller data sizes than small sized image data sets and substitute text data sets that have smaller data sizes than white image data sets.

The present embodiment also provides a Web page distribution system that distributes Web page data sets that require total data sizes not exceeding the maximum data sizes of target terminal devices to display a Web page even when maximum data sizes of the target terminal devices are really small, by referring to, in addition to small sized image data sets that are converted from original image data sets so that their data sizes become smaller than those of their original image data sets and white image data sets that have smaller data sizes than small sized image data sets, substitute text data sets that have smaller data sizes than white image data sets in an inverse order of displays of images in a Web page. Since images displayed in the lower part of the Web page are probably less important than images displayed in the upper part of the Web page, influence of omissions of some of the images in the Web page can be minimized.

The present embodiment also provides a Web page distribution system that distributes Web page data sets that instruct to display images with display sizes that do not exceed the maximum display sizes of target terminal devices with minimum changes in layouts of Web pages, by converting image data sets so that their display sizes become equal or less than the maximum display sizes only when they exceed the maximum display sizes.

The present embodiment also provides a Web page distribution system that distributes Web page data sets that require total data sizes not exceeding the maximum data sizes of target terminal devices even when a load balancing server is introduced to the system without requiring complex changes in the system since distribution requests for image data sets contain parameters used for converting original image data sets. Namely, even when a load balancing server is introduced to the Web page distribution system and a Web page distribution server handling a distribution request for a text data set and a Web page distribution server handling a distribution request for an image data set are different, the later Web page distribution server can determine, by the parameter, how to convert the original image data set to generate an image data set to be distributed to the terminal device sending the distribution request for the image data set. Therefore, there is no need for the plural Web page distribution servers to share converted image data sets.

In a normal Web page distribution system, a relay server conducts conversions of image data sets and text data sets referring to the image data sets so that they meet output conditions required for each of terminal devices. When a load distribution function is installed to such a system, many complicated changes need to be made in both of the Web page distribution servers and the relay server. However, in a Web page distribution system in accordance with the present invention, no such a complicated change is required to realize the load distribution.

In the present embodiment, once an image data set is converted to generate a converted image data set in a Web page distribution server, the converted image data set is stored in the Web page distribution server and reused when the same image data is to be distributed. Accordingly, a Web page distribution system that realizes speedy distributions of Web page data sets that meet output conditions required for each of device models of terminal devices, by saving load and time for converting the same original image data sets to generate the same converted image data sets.

Especially, conversions from original image data set to small sized image data sets or middle sized image data sets require a heavy load of data processing and take a long time. Since the Web page distribution system is required to distribute a large number of image data sets quickly, the above mentioned save of load and time may bring a remarkable efficiency to the system.

In the present embodiment, a text data set is converted so that it indicates a text described in a Web page description language that can be interpreted by a target device, by simply substituting original character strings with their substitute character strings in accordance with a substitute table showing correspondences between character strings used in two different Web page description languages. Since no grammatical analysis is required to execute the conversion of text data set in the present embodiment, when some minor grammatical changes are made to a Web page description language, only updates of the substitute tables are required.

In the present embodiment, a Web page distribution system in accordance with the present invention is realized by installing an add-in module to a general program for a Web page distribution server. Accordingly, a Web page distribution system distributing Web page data sets that meet output conditions required for each of device models of terminal devices can be realized without introducing a new device such as a relay server to an existing Web page distribution system. Moreover, when a load distribution function is installed to the Web page distribution system, since the add-in module can achieve necessary changes in Web page distribution servers, it is only required to install the add-in module to each of the existing Web page distribution servers to realize the Web page distribution system in accordance with the present invention.

In the above part, an exemplary embodiment of the present invention is explained with references to figures, and the present invention should not be limited to the embodiment. Namely, various modifications may be made in the above explained embodiment within the scope of the present invention.

For example, the Web page distribution system is comprised of plural Web page distribution servers $1a, 1b, \ldots$, and a load balancing server 4 in the above explained embodiment, but the present invention should not be limited in this respect and, for example, the Web page distribution system may be comprised of only one Web page distribution server. In the case, the Web page distribution server is directly connected to Internet 3. Even when only one Web page distribution server is provided in the Web page distribution system, the system can distributes Web page data sets that meet output conditions required for each of terminal devices.

In the above explained embodiment, image data sets 12 are not converted or converted to small sized image data sets 13, middle sized image data sets 14a to 14c, white image data sets or substitute text data sets, in accordance with output conditions regarding total data sizes required to display Web pages. The present invention should not be limited in this respect, and for example, image data sets 12 are not converted or converted to only small sized image data sets 13. Namely, any of small sized image data sets, middle sized image data sets, white image data sets and substitute text data sets may be selectively used in the system.

In the above explained embodiment, first image data sets 12 may be converted to small sized image data sets 13, middle sized image data sets 14a to 14c, white image data sets or substitute text data sets, in accordance with output conditions regarding total data sizes required to display Web pages, then the converted image data sets/substitute text data sets may be further converted to middle sized image data sets 14*a* to 14*c* in the order of displays in the Web page under the condition of limitation of total data size. The present invention should not be limited in this respect, and the converted image data sets/substitute text data sets may be further converted to middle sized image data sets in any other order.

In the above explained embodiment, first image data sets 12 may be converted to small sized image data sets 13 in accordance with output conditions regarding total data sizes required to display Web pages, then the small sized image data sets 13 may be further converted to white image data sets or substitute text data sets in the inverse order of displays in the Web page to meet the output conditions. The present invention should not be limited in this respect, and the small sized image data sets may be further converted to white image data sets or substitute text data sets in any other order.

In the above explained embodiment, display sizes of image data sets 12 may be converted in accordance with output conditions regarding maximum display sizes. The present invention should not be limited in this respect, and the conversions of display sizes of images may not necessarily conducted. For example, instead of converting display sizes of image data sets, indications of display sizes in IMG tags may be changed to indicate display sizes equal to or smaller than the maximum display sizes.

In the above explained embodiment, small sized image data sets 13 and middle sized image data sets 14*a* to 14*c* are stored in a Web page distribution server that generated the image data sets, and reused when the converted image data sets are requested. The present invention should not be limited in this respect, and the Web page distribution server may repeat the conversions each time when the converted image data sets are requested.

In the above explained embodiment, a text data set 11 refers to image data sets. The present invention should not be limited in this respect, and a text data set 11 may refer to any other sorts of data sets indicating components of Web pages, such as data sets for application programs executed in mobile phones 2.

In the above explained embodiment, both of text data conversion module 101 and image data conversion module 102 are installed to each of Web page distribution servers 1. The present invention should not be limited in this respect, and for example, text data conversion module 101 is installed to a first Web page distribution server and image data conversion module 102 is installed to a second Web page distribution server, and the first and second Web page distribution servers may cooperatively conduct the conversions in the system. In the case, load balancing server 4 may distribute distribution requests for text data sets 11 to the first Web page distribution server to which text data conversion module 101 is installed, and distribute distribution requests for image data sets 12 to the second Web page distribution server to which image data conversion module 102 is installed.

Since text data conversion module 101 and image data conversion module 102 may be separately installed to Web page distribution servers, when a large number of image data sets are distributed in a Web page distribution system such as a large scale e-commerce Web site, a provider of the Web site has to buy a small number of text data conversion modules 101 and a large number of image data conversion modules 102, and install each of them to each of the existing Web page distribution servers.

In the above explained embodiment, mobile phones 2 are the terminal devices each of which may have different output conditions to display Web pages. The present invention should not be limited in this respect, and any other sorts of terminal devices with output conditions such as maximum data sizes to be handled, such as mobile terminal devices other than mobile phones and computers executing programs with maximum data sizes to be handled (browsers displaying movies, etc.), may be used as terminal devices in the Web page distribution system in accordance with the present invention.

The invention claimed is:

1. A Web page distribution system comprising:
plural distribution servers, each of the plural distribution servers having:
a storing unit that stores a Web page data set containing a Web page text data set indicating a text described in a predetermined Web page description language and one or more Web page component data sets referred to by the text,
a receiving unit that receives a request for the Web page text data set via a network, and receives a request for any one of the one or more Web page component data sets via the network,
a transmitting unit that transmits the Web page text data set in response to the request for the Web page text data set, and transmits any one of the one or more Web page component data sets in response to the request for any one of the one or more Web page component data sets,
a specifying unit that specifies, when the receiving unit receives the request for the Web page text data set, a set of output conditions defining requirements on any Web page displayed at a destination device,
a judging unit that judges, when the specifying unit specifies the set of output conditions, whether the Web page displayed in accordance with the Web page data set meets the set of output conditions, and
a converting unit that converts, when the judging unit judges that the Web page displayed in accordance with the Web page data set fails to meet the set of output conditions, the Web page data set to a converted Web page data set so that the Web page displayed in accordance with the converted Web page data set meets the set of output conditions;
and
plural destination devices, each of the plural destination devices having a set of output conditions defining requirements on any Web page displayed at the destination device, each of the plural destination devices having:
a transmitting unit that transmits a request for the Web page text data set via a network, and transmits one or more requests for the one or more Web page component data sets referred to by the text indicated by the Web page text data set,
a receiving unit that receives the Web page text data set transmitted from any one of the plural distribution servers in response to the request for the Web page text data set, and receives the one or more Web page component data sets, each of the one or more Web page component data sets being transmitted from any one of the plural distribution servers in response to the one or more requests for the one or more Web page component data sets, and
a displaying unit that displays the Web page in accordance with the Web page text data set and the one or more Web page component data sets received by the receiving unit;
wherein the converting unit of each of the plural distribution servers has:
- a component data converting unit that converts, when the receiving unit receives the request for the Web page text data set and the judging unit judges that the Web page displayed in accordance with the Web page data set fails to meet the set of output conditions specified by the specifying unit, at least one of the one or more Web page component data sets to one or more converted Web page component data sets, so that the Web page displayed using the one or more converted Web page component data sets meets the set of output conditions of the destination device, and
- a text modifying unit that modifies, when the component data converting unit converts at least one of the one or more Web page component data sets to the one or more converted Web page component data sets, the Web page text data set to a modified Web page text data set by modifying one or more portions of the text originally referring to the one or more Web page component data sets to refer the one or more converted Web page component data sets by indicating the one or more Web page component data sets and one or more parameters used for converting the one or more Web page component data sets to the one or more converted Web page component data sets; and wherein the transmitting unit of each of the plural distribution servers transmits, when the text modifying unit generates the modified Web page text data set, the modified Web page text data set in response to the request for the Web page text data set instead of the Web page text data set that is originally stored by the storing unit, the component data converting unit of each of the plural distribution servers converts, when the receiving unit of the distribution server receives a request for any one of the one or more Web page component data sets by indicating a Web page component data set and one or more parameters, the Web page component data set indicated by the request using the parameters indicated by the request to generate a converted Web page component data set, if the converted Web page component data set is not available at the distribution server, and the transmitting unit of each of the plural distribution servers transmits, when the component data converting unit generates the converted Web page component data set, the converted Web page component data set in response to the request for any one of the one or more Web page component data sets.

* * * * *